United States Patent [19]

Grimwood

[11] Patent Number: 5,370,796
[45] Date of Patent: Dec. 6, 1994

[54] CENTRIFUGE BASKET OF FIBRE-REINFORCED MATERIAL

[75] Inventor: Geoffrey L. Grimwood, Holmfirth, England

[73] Assignee: Thomas Broadbent & Sons Limited, United Kingdom

[21] Appl. No.: 955,920

[22] Filed: Oct. 2, 1992

[30] Foreign Application Priority Data

Oct. 5, 1991 [GB] United Kingdom ............... 9121174

[51] Int. Cl.⁵ ............................................. B01D 33/044
[52] U.S. Cl. ............................ 210/360.1; 210/380.1; 210/483; 210/496; 210/497.01; 494/16
[58] Field of Search ............... 494/16, 36, 81; 428/36.3, 592; 210/360.1, 364, 365, 367, 380.1, 483, 497.01, 496

[56] References Cited

U.S. PATENT DOCUMENTS

| | | | |
|---|---|---|---|
| 1,259,048 | 3/1918 | Roberts et al. | 210/380.1 |
| 1,827,648 | 10/1931 | Greene | 494/81 |
| 3,316,337 | 4/1967 | North | 264/231 |
| 3,913,828 | 10/1975 | Roy | 494/81 |
| 3,993,243 | 11/1976 | Dietzel et al. | 494/81 |
| 4,468,269 | 8/1984 | Carey | 494/81 |
| 4,817,453 | 4/1989 | Breslich, Jr. et al. | 494/81 |
| 5,057,071 | 10/1991 | Piramoon | 494/16 |

FOREIGN PATENT DOCUMENTS 1554412 10/1979 United Kingdom .

Primary Examiner—Stanley S. Silverman
Assistant Examiner—Robert J. Popovics
Attorney, Agent, or Firm—Christie, Parker & Hale

[57] ABSTRACT

A centrifuge basket shell formed by winding fiber-reinforced resin tape in a helical pattern over a thin shell plate which contains a plurality of holes for the passage of liquid therethrough, perforations being formed in the helix pattern of the wound tape by means of respective hollow ferrules connected rigidly to a cylindrical part of the shell plate, so as to enable liquid which passes through said holes in the shell plate to pass also through the helices of wound tape without increasing the stresses induced therein by rotation.

6 Claims, 8 Drawing Sheets

CENTRIFUGE BASKET OF FIBRE-REINFORCED MATERIAL

BACKGROUND OF THE INVENTION

The present invention is concerned with the design and structure of rotating centrifuge baskets of the type used in industrial processes for the separation of solids and liquids.

When rotated, the shells of centrifuge baskets are subjected to circumferential or hoop stresses induced by the mass of the basket material (the self stress) and additional hoop stresses induced by the material in the basket being processed (the applied stress), the basket shell being subjected to a total hoop stress that is the sum of these two stresses. In addition, axial forces on the ends of the basket, induced by the material being processed, produce axial and bending stresses which, although less than the total hoop stress, are substantial if the material being processed is in the fluid state. In the present state of the art, baskets made for industrial centrifuges are constructed in steel, with strengthening rings of steel or of fibre-reinforced plastics (see for example GB 1554412) fitted on the outside to withstand the total hoop stress if the shell alone cannot support these stresses. The basket shell is perforated to allow the flow of liquid from the material being processed, the solids remaining in the basket to be discharged when the separation is complete.

Centrifuges are often required to discharge the separated solids at low speed (typically 50 rpm) having accelerated the material supplied to a spin speed (typically 1500 rpm) to perform the solid liquid separation - repeating this process cyclically and frequently (typically 25 times per hour). The energy demand to accelerate and decelerate the basket loaded with material is proportional to the total inertia of the loaded basket - that is the inertia of the mass of the basket plus the inertia of the material contained therein.

One disadvantage of the present state of the art for industrial centrifuges is the large inertia of the basket itself (typically 50–60% of the total inertia) giving a low "payload" (defined as: the inertia of the material being processed÷total inertia) and correspondingly high energy consumption.

A second disadvantage is that the perforations in the shell result in local stress concentrations in the steel around each perforation in excess of the mean total hoop stress applied to the basket, together with a reduction in the cross sectional area of the shell available to support the total hoop stress.

A third disadvantage is that steel, being an isotropic material, is not fully utilised, as the stresses induced by the axial forces are less than the hoop stresses.

It is an object of the present invention to overcome, or at least to mitigate, these disadvantages of the prior art devices.

SUMMARY OF THE INVENTION

In accordance with the present invention, the basket shell and end plates are formed by winding fibre-reinforced resin tape in a helical pattern over a thin shell plate which contains a plurality of holes for the passage of liquid therethrough, perforations being formed in the helix pattern of the wound tape to enable liquid which passes through said holes in the shell plate to pass also between the helices of wound tape without increasing the stresses induced therein by rotation.

The anisotropic properties of the fibre in the tape are used to establish the helix angle at which the tape is wound so as to support higher hoop and lower axial and bending stresses.

Preferably, said perforations in the helix pattern of the wound tape are formed by respective hollow ferrules connected rigidly to the shell.

Dimples can be provided on the inner surface of the shell plate to provide a space between this shell plate and the conventional filter mesh disposed within the basket whereby to result in a reduction in the resistance to liquid flow through the basket.

BRIEF DESCRIPTION OF THE DRAWINGS

The invention is described further hereinafter, by way of example only, with reference to the accompanying drawings, in which.

DETAILED DESCRIPTION

Figure 1:
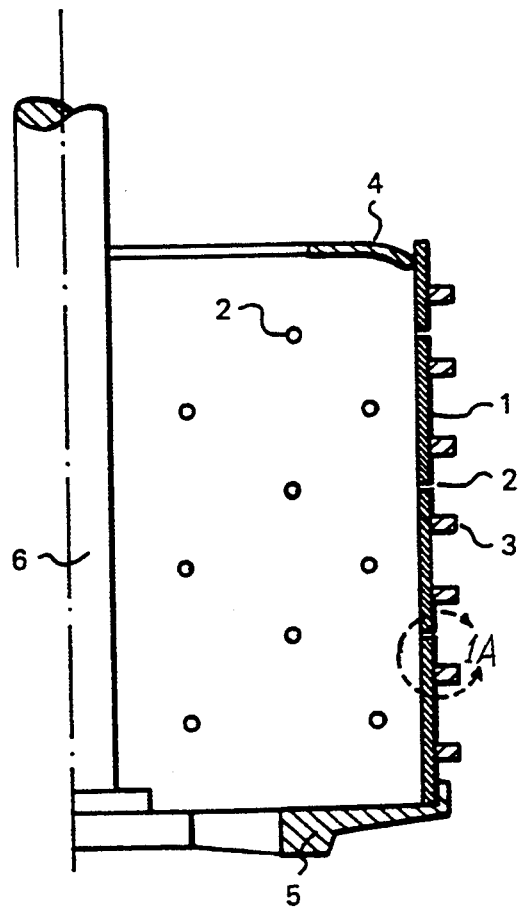
FIG. 1 is a diagrammatic half-section of one embodiment of a typical prior art centrifuge basket using reinforcing rings or hoops.

FIG. 1 shows a half-section of a typical prior art basket. This basket has a shell 1 which contains perforations 2 and is supported by surrounding hoops or rings 3. The shell 1 is welded at one end to the basket top end plate 4 and at the other end to the basket bottom end plate 5. The bottom end plate 5 is connected to a main spindle 6.

Reference is now made to FIGS. 2–5 in connection with the steps taken to assemble a typical basket in accordance with the present invention.

Figure 2A:
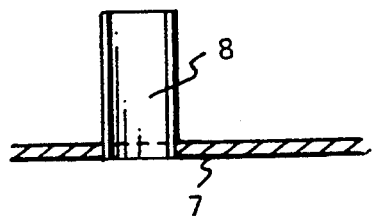
FIG. 2A is a detail of the shell of FIG. 2 showing a hollow ferrule mounted within the shell.
Figure 2:
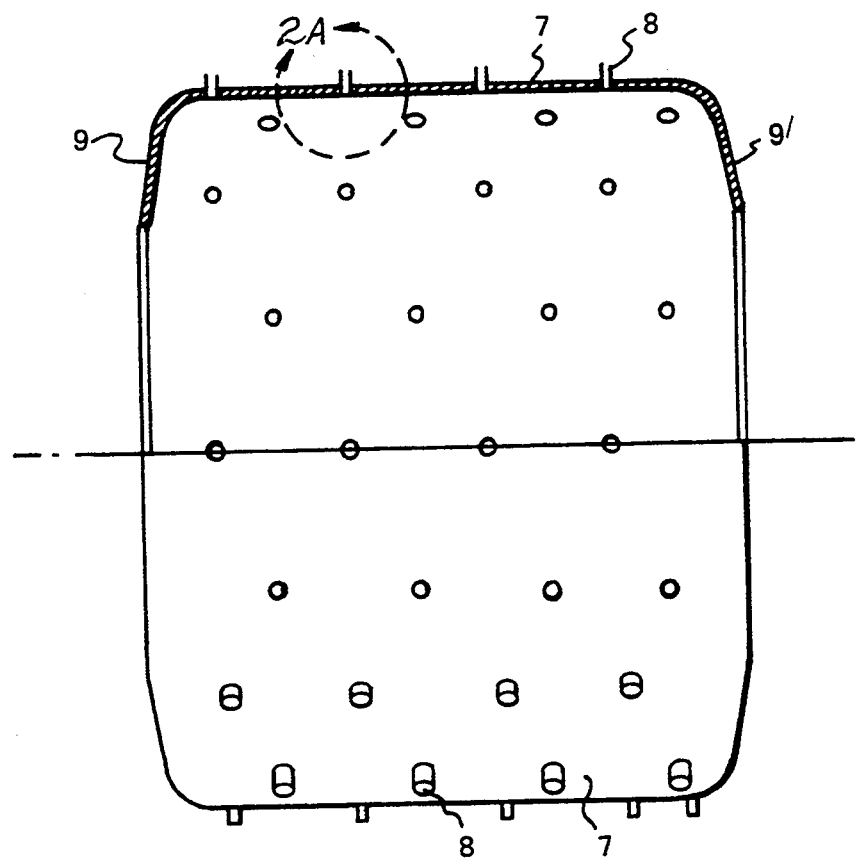
FIG. 2 is a sectional view through a metal shell plate for constructing a centrifuge basket in accordance with the present invention.

FIG. 2 shows a thin basket inner shell plate 7 with its axis horizontal and onto which fibre-reinforced resin tape will be wound to form the complete basket, the shell plate 7 being shaped to the inside dimensions required for the finished basket. The shell plate 7 (typically made of stainless steel between 1–5 mm thick) is fitted with hollow metal ferrules 8 of length at least equal to that of the final thickness of fibre reinforced resin tape to be wound onto the shell plate 7, acting as a former. The shell plate 7 is shaped to form the basket top and bottom plates 9,9′, equivalent to the end plates 4, 5 of the known construction when wound with fibre reinforced resin tape, as described hereinafter.

Figure 3:
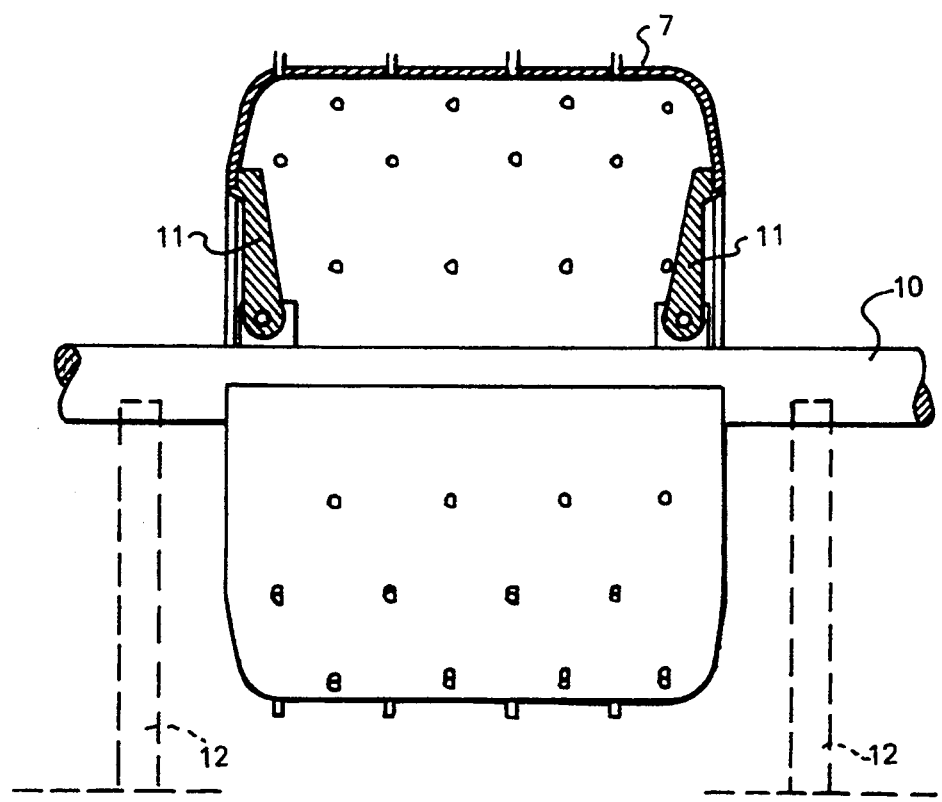
FIG. 3 is a part section showing how the shell of FIG. 2 is supported during winding thereon of a fibre reinforced tape in accordance with the invention.

FIG. 3 shows the basket shell plate 7 mounted on a spindle 10 and supports 11, and rotatable in support bearings 12 in preparation for winding the fibre reinforced resin tape onto the outside of the shell plate 20 when the spindle 10 is rotated. The supports 1i are collapsible to assemble the shell plate basket and to remove the wound basket and are held rigidly in the illustrated radial position during winding.

Figure 4:
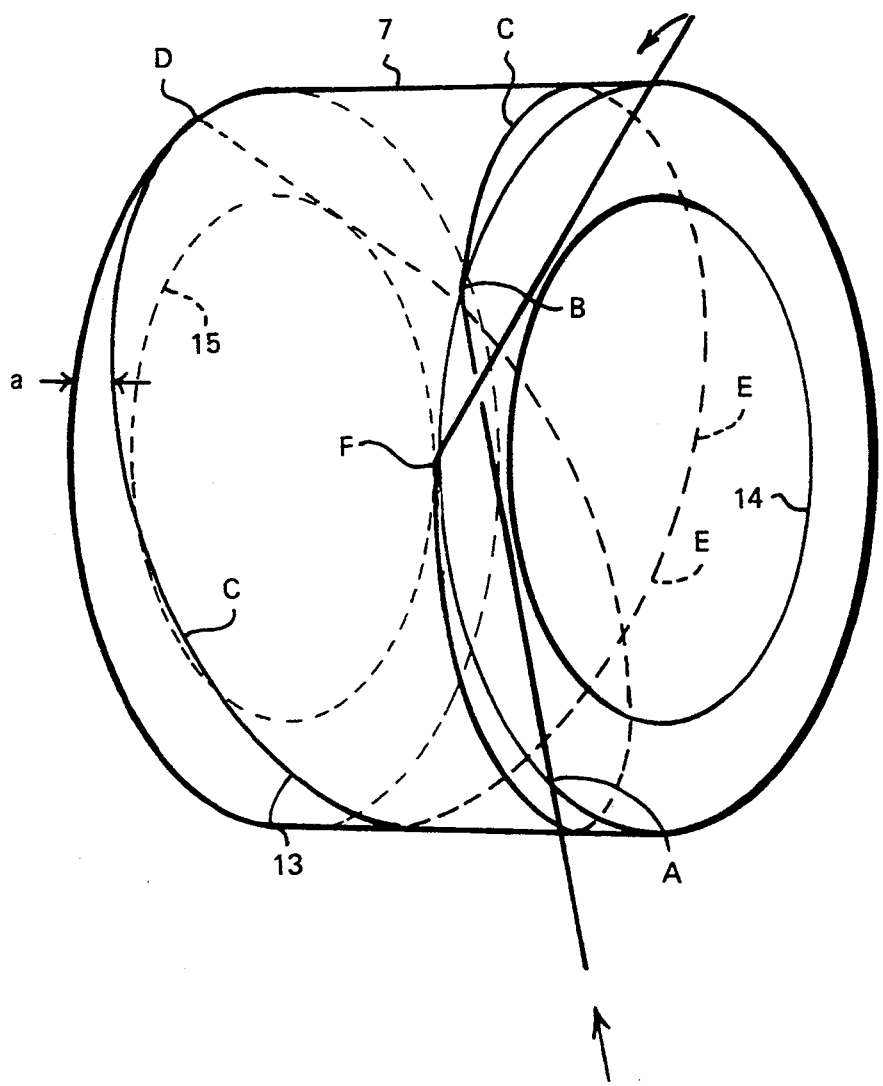
FIG. 4 is an isometric view illustrating the helix track of fibre-reinforced tape during the early stage of one winding technique in accordance with the present invention.

FIG. 4 shows the arrangement illustrated in FIG. 3 but in a simplified isometric form and omitting the ferrules to show the helix track of the fibre reinforced resin tape 13 during the early stage of one possible version of the winding process. Typically, winding commences at point A, with the tape 13 passing over the shell plate forming the basket top (tangential to the opening 14) to B and around the cylindrical part of the shell plate (at CC), passing over the shell plate forming the basket bottom D (tangential to the opening 15) and around the cylindrical part of the shell plate (at E.E.), to complete one winding cycle at the basket top (F). The winding process is then repeated continuously, the tape advancing around the shell plate at the end of each winding cycle until the complete basket shell and top and bottom plates are covered with the required thickness of fibre reinforced resin tape. In its simplest form, the spiral angle 'a' is chosen so that the ratio:cos 'a'+sin 'a' is equal to the total hoop stress+axial stress, thus ensuring full use of the anisotropic properties for the fibre reinforcement.

Figure 5:
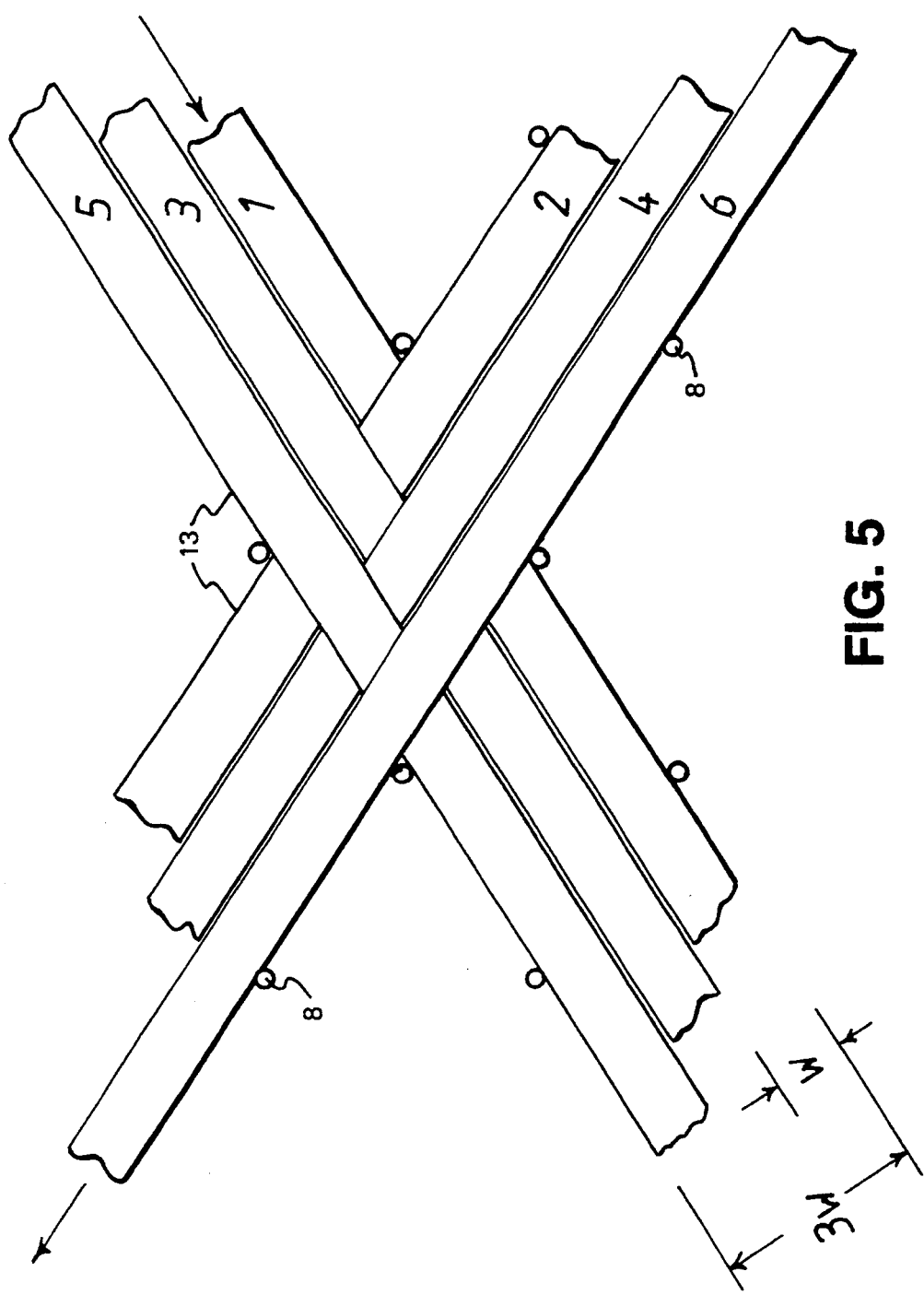
FIG. 5 shows a small section of basket part-wound as illustrated in FIG. 4.

FIG. 5 shows a small section of a basket part-wound as illustrated in FIG. 4. The helixes of the tapes 13 are numbered in the order in which they are wound: 1,2,3 etc. In this example, a tape of rectangular section is used, of such a width 'w' that three tapes set at the spiral angle 'a' cover the shell between adjacent sets of ferrules 8.

Figure 6:
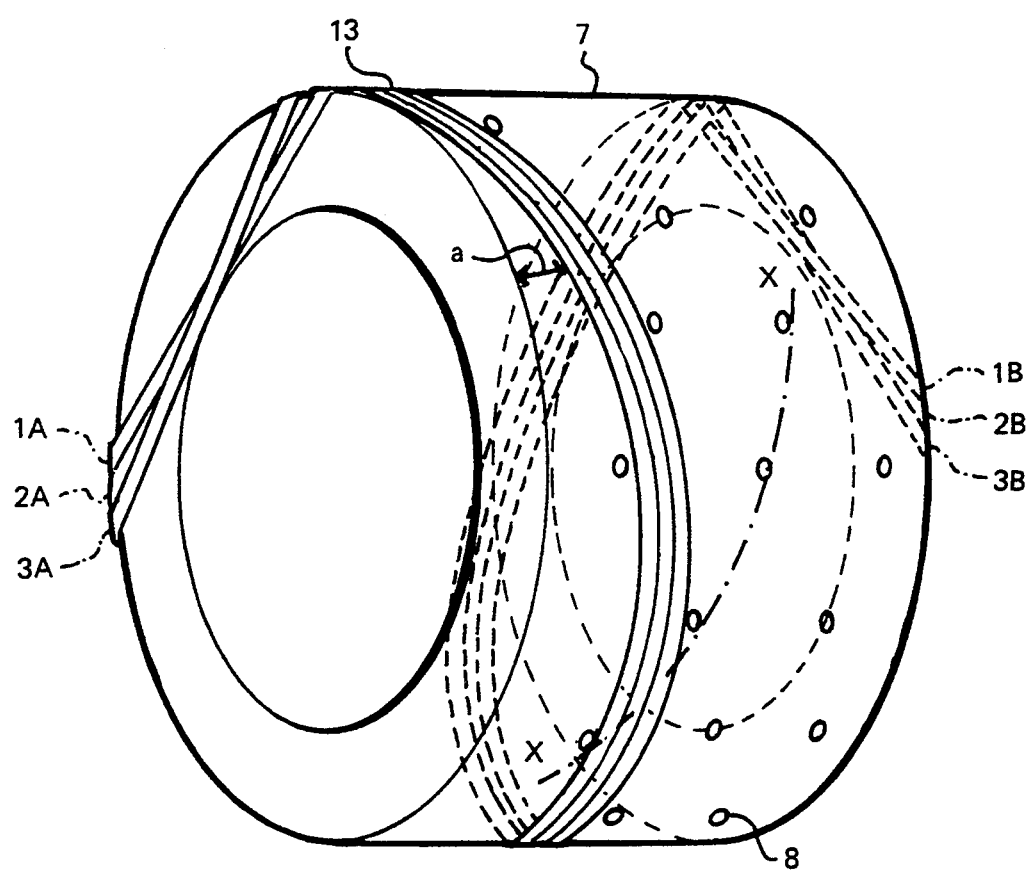
FIG. 6 is an isometric view illustrating the helix track of fibre-reinforced tape wound in accordance with a second technique in accordance with the present invention.

FIG. 6 is a simplified isometric view showing the positions of the ferrules and illustrating an alternative winding routine for winding the fibre reinforced resin tape 13 onto the shell plate 7. Winding commences at point (1A), passes over the basket top, is wound at a helix (angle 'a') over the cylindrical portion of the shell plate 7, passes over the basket bottom and ends at point (1B). Winding is repeated along a parallel track from (2A) to (2B), and again from (3A) to (3B) until the helix space between two adjacent sets of ferrules is covered. This winding process is repeated to cover all helix tracks on the shell 7 between the ferrules, firstly in the direction shown in solid lines in FIG. 6 and then in the reverse direction as indicated by the chain line path XX. Whilst three tapes are shown in FIG. 6, the number used in practice will depend upon the spacing of the perforations, the helix angle 'a', the tape width and the basket design requirements.

Figures 7, 7A, 7B:
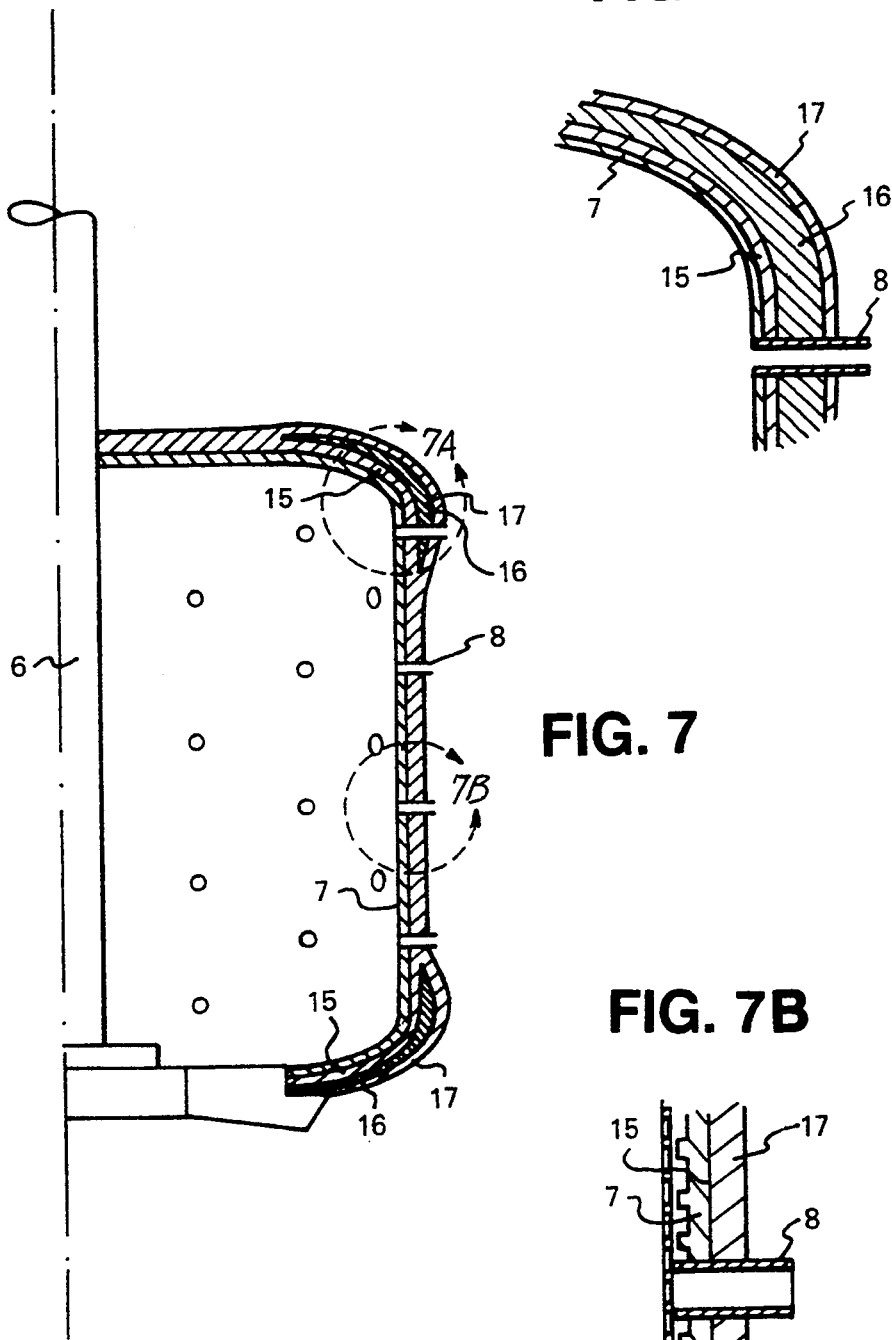
FIG. 7 is a half-section of a basket formed by the present invention and incorporating optional corner reinforcement pieces.
FIG. 7A is a detail of FIG. 7 showing the fitting of a corner reinforcement piece in more detail.
FIG. 7B is a further detail of FIG. 7 showing the liquid path from the material being centrifuged to the outside of the basket, in accordance with one embodiment of the present invention.

FIG. 7 shows a cross-section of a preferred arrangement, for baskets made as described above, to support bending stresses on the basket top and bottom end plates 9 and 9′. After one or more complete layers of tape 15 have been wound on to the shell plate 7, corner reinforcement pieces 16 are added (typically resin impregnated chopped fibre mat). Further layers of tape 17 are then spirally wound in one or more layers over the layers 15 previously wound and over the corner reinforcements 16 until the required total thickness of fibre reinforced resin has been built up to withstand the stresses induced when the finished basket is rotated at spin speed. By using fibres of high tensile strength to reinforce the resin and setting the spiral angle 'a' to the stress pattern the anisotropic properties are used fully and no external hoops need be added to Support the shell.

Figure 8:
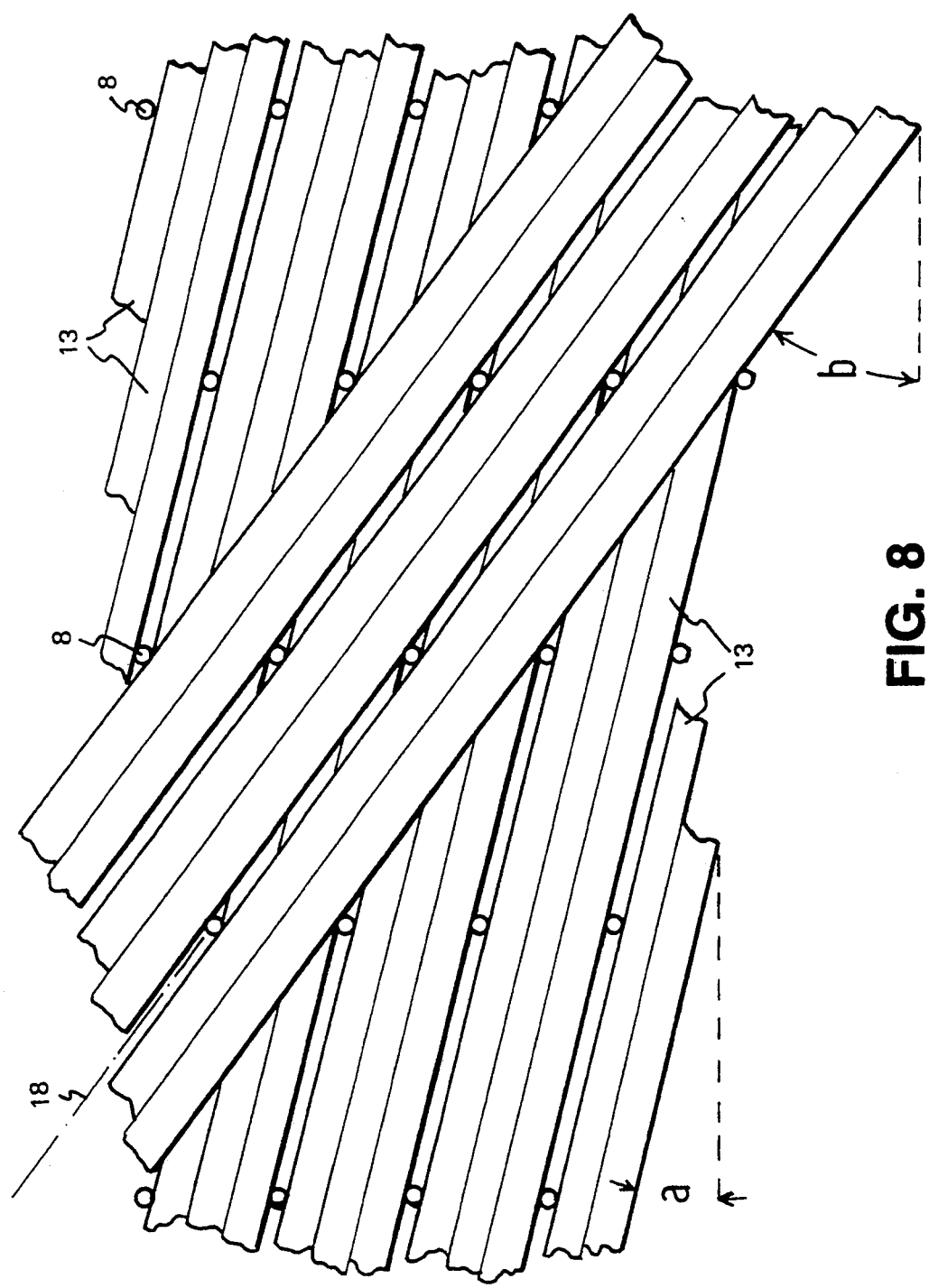
FIG. 8 is an isometric view illustrating an alternative helix track when the helix angle required differs from the helix line through the ferrules.

FIG. 8 shows a method of winding the tape 13 on a small section of the shell 7 when the helix angle required (to make full use of the anisotropic fibre properties) differs from the helix line 18 through the ferrules. The method shown in FIG. 8 is applicable to the winding shown in FIG. 6 but applies also to that shown in FIGS. 4 and 5. One or more layers of tape (13) are wound at helix angle 'a' (19) followed by one or more at helix angle 'b' 20. By choosing the numbers of layers wound and each helix angle an equivalent helix angle between the limits 'a' and 'b' is produced to match the total hoop stress+axial stress.

Figure 9:
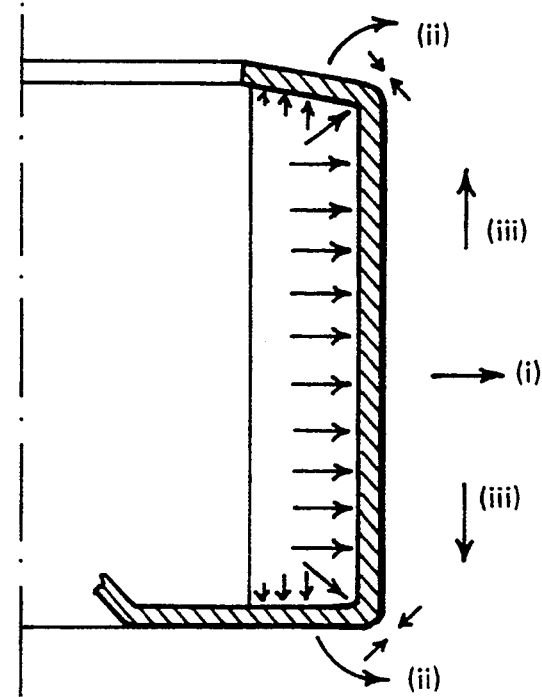
FIG. 9 is a diagrammatic illustration showing pressure distribution when a basket as shown in FIG. 7 is rotated and fed with a slurry.

When a basket constructed as shown in FIG. 7 is rotated at speed and fed with a slurry, the initial centrifugal load on the basket is that of a liquid with pressure perpendicular to all the inner faces of the drum, as shown by arrows in FIG. 9. This imposes:

(i) simple hoop (tensile) stress on the cylindrical wall of the drum;

(ii) complex bending stresses on the annular end pieces, including compressive stresses at the junction of the cylindrical and annular pieces that form the basket;

(iii) axial tensile stresses on the cylindrical wall of the drum resulting from the pressure on the annular end pieces.

The above described helix winding, using two helix angles (a and b) and adjusting the number of layers in each so that the strength of the fibre reinforced resin in the axial and radial directions, precisely balances stresses (i) and (iii), these stresses being at right angles to each other. The above described constructor at the junction of the cylindrical and annular pieces (using corner reinforcing pieces between the inner and outer helix windings) balances stress (ii).

For all centrifuge baskets, it is necessary to provide a fluid path of adequate cross-sectional area for the flow of liquid from the material in the basket during the separation process.

Figure 1A:
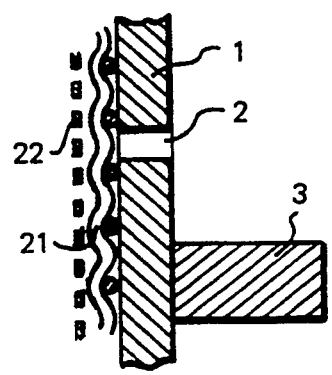
FIG. 1A is an enlarged detail of FIG. 1, showing the liquid path from the material being centrifuged to the outside of the basket.

FIG. 1A shows the present state-of-the-art arrangement to provide this liquid path from the material to the nearest perforation. The steel basket 1 is lined with a woven mesh 21 or equivalent, which in turn supports a thin metal perforated screen 22 with holes of a size that retain the solids within the basket but allow the liquids to pass through. The liquid flows through the perforated metal plate 22 and axially along the woven screen 21 to the nearest perforation 2.

FIG. 7B shows the improved arrangement whereby the thin inner shell plate 7 is "dimpled" or otherwise raised locally (by known means) to provide protrusions 23 to support a thin perforated metal screen 22 and thereby provide a liquid path of increased crosssectional area, allowing a more rapid discharge of the liquid from the basket.

By means of the techniques described above, the disadvantages of the prior art baskets are overcome. The new basket can have a marked reduction in inertia (typically up to 55% of that of a conventional steel basket), thereby substantially increasing the usable payload and reducing the total inertia, with a corresponding reduction in energy consumption.

I claim:

1. A centrifuge basket for a centrifuge of the type used in industrial processes for the separation of solids and liquids, comprising:

a thin, metal, non-load bearing, inner shell having a cylindrical portion and respective annular end flange portions which are formed integrally with said cylindrical portion;

a plurality of apertures formed in said cylindrical portion of the shell to enable fluid flow through the shell over at least part of said cylindrical portion thereof;

a plurality of ferrules which are rigidly mounted to said cylindrical shell portion so as to extend radially outwardly therefrom and which are in communication with respective ones of said apertures;

a continuous single winding of flat, fibre-reinforced resin tape formed in a helical mutilayer pattern of adjacent winding passes over said cylindrical portion and both said annular end flange portions of said thin shell such that said tape is substantially unstressed when the basket is not in rotation, said ferrules extending between adjacent passes of said helical winding to enable liquid which passes into said apertures in the shell to pass also between said adjacent winding passes of said wound tape;

respective corner reinforcement pieces disposed between said cylindrical portion of the shell and said annular end flange portions, said reinforcement pieces being positioned intermediate inner and outer layers of the multi-layer helically wound tape;

a cylindrical filter mesh disposed within said cylindrical portion of said basket shell;

and a plurality of dimple means projecting radially inwardly from said cylindrical portion of said shell and engaging said cylindrical filter mesh at respective discrete contact points to provide a space between the shell and the filter mesh for aiding the flow of liquid through the basket.

2. A centrifuge basket according to claim 1 wherein the ferrules and the helix pattern of the tape are positioned so that a whole number of widths of tape wound as a spiral angle cover the shell plate between adjacent sets of ferrules.

3. A centrifuge basket according to claim 1 having a hoop stress and an axial stress wherein said spiral angle, designated "a", of the wound tape is selected such that the ratio $\cos a / \sin a$ is equal to $\text{total hoop stress} / \text{axial stress}$.

4. A centrifuge basket according to claim 1 wherein winding of the tape is commenced at one annular end piece of the shell plate and proceeds tangentially in relation to the central aperture in that end piece, then spirally around the cylindrical part of the shell between the ferrules, tangentially across the opposite end piece and then spirally around the cylindrical part again so as to return to the first piece.

5. A centrifuge basket according to claim 4 in which one or more layers of tape are wound at a first helix angle followed by one or more further layers at a second helix angle to provide an intermediate helix angle.

6. A centrifuge basket according to claim 1 wherein winding of the tape commences at a first point on one annular end piece of the shell plate, passes over the basket top, is wound at a predetermined helix angle over the cylindrical portion of the shell plate, passes over the basket bottom and ends at a second point, winding then being repeated along a parallel track from a third point to a fourth point, and again from a fifth point to a sixth point until the helix spaced between two adjacent sets of ferrules is covered, this winding process being repeated to cover all helix tracks on the shell between the ferrules, firstly in one direction and then in the reverse direction.

* * * * *

UNITED STATES PATENT AND TRADEMARK OFFICE
CERTIFICATE OF CORRECTION

PATENT NO. : 5,370,796                                    Page 1 of 2
DATED : December 6, 1994
INVENTOR(S) : Geoffrey L. Grimwood It is certified that error appears in the above-indentified patent and that said Letters Patent is hereby corrected as shown below:

```
On the title page, [56] References Cited, FOREIGN PATENT
       DOCUMENTS, insert the following references:
       -- 1940737   6/1971   Germany
          1936921   2/1971   Germany
          3116520  11/1982   Germany
          1063063   4/1987   Japan     --.

Column 1, line 45, change "processed + total inertia" to
          -- processed ÷ total inertia --.

Column 2, line 53, after "invention;" delete "and".
Column 2, line 56, change "ferrules." to
          -- ferrules; and --.

Column 3, line 21, change "1i" to -- 11 --.
Column 3, line 42, change "'a' + sin" to -- 'a' ÷ sin --.
Column 3, line 43, change "stress + axial" to
          -- stress ÷ axial --.

Column 4, line 7, change "on to" to -- onto --.
Column 4, line 18, change "Support" to -- support --.
Column 4, line 31, change "stress + axial" to
          -- stress ÷ axial --.
```

UNITED STATES PATENT AND TRADEMARK OFFICE
CERTIFICATE OF CORRECTION

PATENT NO. : 5,370,796
DATED : December 6, 1994
INVENTOR(S) : Geoffrey L. Grimwood It is certified that error appears in the above-indentified patent and that said Letters Patent is hereby corrected as shown below:

Column 5, lines 3,4 Change "crosssectional" to
-- cross-sectional --.

Signed and Sealed this

Twenty-sixth Day of September, 1995

Attest:

BRUCE LEHMAN

*Attesting Officer*         *Commissioner of Patents and Trademarks*